June 26, 1923.

C. M. NEVIUS

COFFEE ROASTER

Filed Sept. 8, 1922

1,459,791

Inventor
Convict M. Nevius
by his attorney
Farnum F. Worsey

Patented June 26, 1923.

1,459,791

UNITED STATES PATENT OFFICE.

CONDICT M. NEVIUS, OF HORNELL, NEW YORK.

COFFEE ROASTER.

Application filed September 8, 1922. Serial No. 586,980.

*To all whom it may concern:*

Be it known that I, CONDICT M. NEVIUS, a citizen of the United States, residing at Hornell, in the county of Steuben and State of New York, have invented certain new and useful Improvements in Coffee Roasters; and I do hereby declare the following to be a full, clear, and exact description of the invention, such as will enable others skilled in the art to which it appertains to make and use the same.

One object of the present invention is to produce a coffee-roaster in which heat may be effectively and economically applied to the coffee, and particularly in which electric heaters may be used with advantage. To this end it is proposed to so arrange the roaster that the coffee is held in a continuous series of pockets or receptacles, entirely surrounding the heating devices, so that all of the heat radiated from the latter will be effective in heating the coffee. In order that the effect may be made uniform on all parts of the coffee, these pockets are moved continuously around the heaters, and for convenience in filling and emptying them they are formed with open outer sides, the coffee being retained within them by a closely fitting housing within which the pockets are moved. Other features of the invention reside in certain details of construction of this housing which will be set forth hereinafter.

Another object of the invention is to provide, in a simple manner, for the removal of smoke produced during the roasting operation, and to this end it is proposed to so combine the roasting-apparatus with a pneumatic cooler and elevator as to utilize the suction of the latter to withdraw the smoke from the successive pockets of the roaster as they pass a certain point in the machine.

Figure 1:
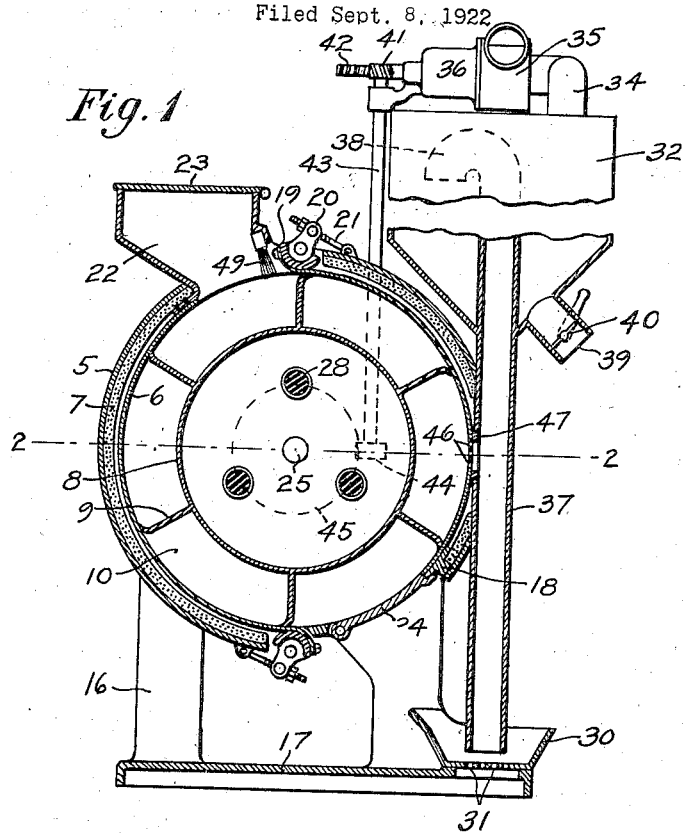
Figure 2:
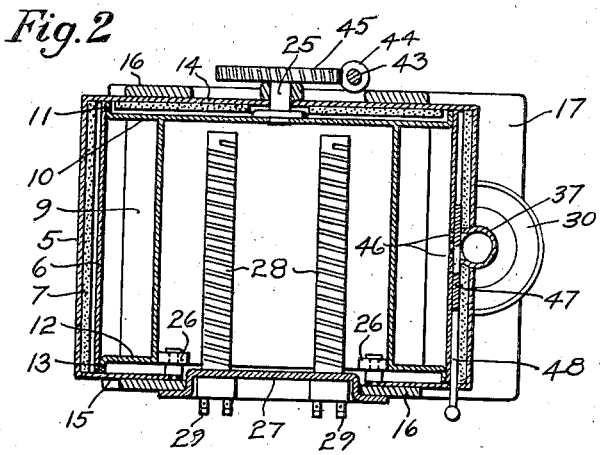

In the accompanying drawings Fig. 1 is a sectional side-elevation of a coffee-roaster embodying the present invention; and Fig. 2 is a horizontal section on the line 2—2 in Fig. 1.

The invention is illustrated as embodied in a machine in which the housing has a generally cylindrical form and comprises an outer shell 5 and an inner shell 6, with a layer of heat-insulating material 7 interposed. Within the housing is a carrier of generally cylindrical form, comprising a drum 8, from which a series of longitudinal partitions or walls 9 project radially so as to produce, between them, a series of pockets or receptacles for the coffee. The ends of the pockets at the rear end of the drum are closed by a head 10 fixed to the drum, while the pockets are closed at their forward ends by a flange 12 on the drum. The head and the flange are provided with outwardly-turned lips 11 and 13 which bear closely against the inner shell 6 of the housing, and the outer edges of the walls 9 also bear against the shell, so that the coffee is closely confined in the several pockets. The ends of the housing are closed by heads 14 and 15, and the housing is supported by a frame 16 attached to the heads and rising from a base 17.

In order to insure that there shall always be a close bearing between the rotary carrier and the shell 6, it is desirable to provide an adjustment of the latter to compensate for wear or for inaccuracy in manufacture. The shell is therefore made in two parts, and the lower end of one part is attached to a crossbar 18 of the frame, while the upper end is attached to a segmentally curved bar 19 which is pivotally mounted at its ends. By means of an arm 20 at one end of the bar 19, and a swivel-bolt 21 attached to the arm, the bar may be rocked so as to draw the flexible sheet-metal of the shell more or less tightly around the periphery of the carrier. The other part of the shell 6 is similarly supported and adjusted.

The coffee is introduced into the machine through a hopper 22, provided with a cover 23. It is removed, after the roasting is finished, through a door 24. This door is normally closed and is shaped to form a continuation of the cylindrical inner surface of the shell 6.

To permit the rotary movement of the carrier, it is supported, at the rear end, by a shaft 25 which is journalled in the frame 16, while the forward end of the carrier is supported by rollers 26 mounted on the frame and engaging the inner surface of the drum 8.

The front head 15 of the housing is made with a central opening, which is normally closed by a removable cover 27. This cover serves as a support for the heating means, which are shown as elongated electric heating elements 28, provided with external binding-posts 29 by which they may be connected with a suitable source of current. This arrangement affords great convenience in inspecting or repairing the heating means when necessary, while the housing normally is tightly closed to prevent the escape of heat.

To prevent grains of coffee from being crushed in case they become caught between one of the walls 9 and the side of the hopper 22, the hopper is provided with a yielding lip in the form of a brush 49, made of stiff bristles or wires, which will yield and prevent any jamming at this point.

The roasting means just described are combined with pneumatic cooling and elevating means. At the bottom of the machine is a hopper 30 arranged to receive the coffee when discharged by opening the door 24, the door serving, when open, as a chute to direct the coffee into the hopper. The hopper has perforations to permit the escape of small stones or other foreign matter which may be mixed with the coffee. A pneumatic suction-pipe 37 rises from the hopper, and its re-curved upper end discharges into an air-tight collector 32. Air is withdrawn from the collector, through a pipe 34, by a blower 35, which is driven by an electric motor 36. The coffee in the hopper 30 is raised by the current of air produced in the suction-pipe 37 by the action of the blower, and the coffee collects in the collector and may be withdrawn therefrom through a spout 39 controlled by a valve 40.

The motor 36 is utilized also as a source of power to actuate the rotary member of the roaster. For this purpose the motor-shaft is provided with a worm 41 which drives a worm-wheel on the upper end of a shaft 43. A worm 44 on the lower end of the shaft 43 drives a worm-wheel 45 fixed on the shaft 25, and thus rotates this shaft, and the drum 8, constantly during the roasting operation.

In order to draw off the smoke produced in roasting the coffee, the inner shell 6 of the housing is provided with small perforations 46 at a point adjacent the suction-pipe 37, which communicates with an opening in the side of the pipe. This connection is controlled by a sliding valve 47, operated by a handle 48. This valve may be closed when coffee is being raised from the hopper 30, but when it is open the smoke is withdrawn from each pocket of the carrier as it rotates past the openings 46.

When coffee is to be roasted in this machine, the several pockets of the carrier are filled in turn, through the hopper 22, and the cover 23 is closed and the motor allowed to impart a continuous slow rotation to the carrier for the period necessary. The heat radiated from the electric heaters 28 passes readily through the thin sheet-metal of the drum 8, but is retained within the housing by the insulating-material 7. The heaters affect all of the pockets at once, and the rotary movement serves to equalize any slight differences which might otherwise exist in the effect on different portions of the coffee. As soon as the roasting is finished the discharge-valve 24 is opened, and the rotation of the carrier causes each pocket in turn to be emptied into the hopper 30, from which the coffee is at once raised to the collector 32, in the manner already described.

While the endless carrier has been shown, for simplicity of construction, as of rigid cylindrical form, it is not limited to this form, and, in general, the invention is not limited to the details of form and arrangement of the illustrated embodiment, but may be embodied in various other forms within the spirit of the invention and the scope of the following claims.

The invention claimed is:

1. A coffee-roaster comprising: a continuously-movable endless carrier provided with a peripheral series of outwardly-open receptacles for coffee; a housing closely embracing the carrier and constituting normally a closure for all of the receptacles, but provided with openings for the introduction and removal of the coffee; and stationary radiant heating means located within and embraced by the carrier so as to heat all parts of the carrier simultaneously.

2. A coffee-roaster comprising: a generally-cylindrical rotary carrier provided with a series of substantially radial walls providing intermediate coffee-receptacles; a stationary housing closely embracing the carrier and having an inner cylindrical surface engaging the outer edges of said radial walls, said surface being provided, in part, by a cylindrically curved flexible metal sheet, normally fixed but adjustable longitudinally to secure close engagement with said walls.

3. A coffee-roaster comprising: a stationary housing; a continuous carrier movable therein and provided with a series of coffee-receptacles; a hopper into which the roasted coffee is discharged from the housing; an air-pipe for raising the coffee from said hopper; means for creating a partial vacuum within the air-pipe, to cause air and coffee to be drawn into and through it; and a valve-controlled passage through the wall of the housing and into the air-pipe, said passage being positioned to communicate with the receptacles of the carrier successively as the carrier moves within the housing.

CONDICT M. NEVIUS.